US009002328B2

(12) United States Patent
Aaron (10) Patent No.: US 9,002,328 B2
(45) Date of Patent: Apr. 7, 2015

(54) ELECTRONIC CALENDAR FOR AUTOMATICALLY SCHEDULING A PLURALITY OF EVENTS BASED ON A SCHEDULING REQUEST AND OBTAINED ADDITIONAL INFORMATION

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 3253 days.

(21) Appl. No.: 10/955,160

(22) Filed: Sep. 30, 2004

(65) Prior Publication Data
US 2006/0041460 A1    Feb. 23, 2006

Related U.S. Application Data

(63) Continuation-in-part of application No. 10/924,072, filed on Aug. 23, 2004, now Pat. No. 7,735,091.

(51) Int. Cl.
*H04M 3/42* (2006.01)
*G09B 7/00* (2006.01)
*G06Q 10/10* (2012.01)

(52) U.S. Cl.
CPC .............. *G09B 7/00* (2013.01); *G06Q 10/1093* (2013.01)

(58) Field of Classification Search
None
See application file for complete search history.

(56) References Cited

U.S. PATENT DOCUMENTS

| | | | | |
|---|---|---|---|---|
| 4,626,836 | A * | 12/1986 | Curtis et al. ................... | 345/156 |
| 5,070,470 | A * | 12/1991 | Scully et al. ................... | 708/112 |
| 6,085,166 | A * | 7/2000 | Beckhardt et al. ................ | 705/9 |
| 6,101,480 | A * | 8/2000 | Conmy et al. .................... | 705/9 |
| 6,388,772 | B1 * | 5/2002 | Williams ....................... | 358/448 |
| 6,560,655 | B1 * | 5/2003 | Grambihler et al. .......... | 709/248 |
| 6,820,096 | B1 * | 11/2004 | Kanevsky et al. ............ | 707/201 |
| 6,988,128 | B1 * | 1/2006 | Alexander et al. ............ | 709/206 |
| 6,999,993 | B1 * | 2/2006 | Shah et al. ..................... | 709/207 |
| 7,082,402 | B2 * | 7/2006 | Conmy et al. .................... | 705/8 |
| 7,369,750 | B2 * | 5/2008 | Cheng et al. .................... | 386/83 |
| 7,584,278 | B2 * | 9/2009 | Rajarajan et al. ............. | 709/226 |
| 2001/0014866 | A1 * | 8/2001 | Conmy et al. .................... | 705/9 |
| 2001/0014867 | A1 * | 8/2001 | Conmy ............................ | 705/9 |
| 2002/0016729 | A1 * | 2/2002 | Breitenbach et al. ............ | 705/9 |
| 2002/0044149 | A1 * | 4/2002 | McCarthy et al. ............ | 345/581 |
| 2003/0028399 | A1 * | 2/2003 | Davis et al. ....................... | 705/2 |

(Continued)

OTHER PUBLICATIONS

Bumble, Marc David (2001). A parallel architecture for non-deterministic discrete event simulation. Ph.D. dissertation, The Pennsylvania State University, United States—Pennsylvania.*

(Continued)

*Primary Examiner* — Gurkanwaljit Singh
(74) *Attorney, Agent, or Firm* — Myers Bigel Sibley & Sajovec (57) ABSTRACT

An electronic calendar is provided to a user that receives a request to schedule an event from the user. Additional information related to the user and/or the event is obtained by prompting the user for the additional information and/or obtaining the additional information from a database communicatively coupled to the electronic calendar. A plurality of events are scheduled based on the request to schedule an event and the obtained additional information.

6 Claims, 6 Drawing Sheets

(56) References Cited

U.S. PATENT DOCUMENTS

| | | | |
|---|---|---|---|
| 2003/0046304 A1* | 3/2003 | Peskin et al. | 707/104.1 |
| 2003/0171973 A1* | 9/2003 | Wilce et al. | 705/9 |
| 2004/0031035 A1* | 2/2004 | Shiu et al. | 718/102 |
| 2004/0078256 A1* | 4/2004 | Glitho et al. | 705/8 |
| 2004/0125142 A1* | 7/2004 | Mock et al. | 345/765 |
| 2004/0139452 A1* | 7/2004 | Hope et al. | 719/318 |
| 2004/0167877 A1* | 8/2004 | Thompson, III | 707/3 |
| 2004/0216168 A1* | 10/2004 | Trovato et al. | 725/135 |

OTHER PUBLICATIONS

Controlling appointments Warner, Paul D The CPA Journal; Nov. 1994; 64, 11; ABI/INFORM Global p. 40.*

"Heterogeneous Sensor Networks", Intel Technology Journal, 2003. (website: www.intel.com/research/exploratory/hetergenoeous/.htm.

Butler, Jim, "Mobile robots as gateways into wireless sensor networks", LinuxDevices.com, May 2, 2003.

Green, Heather, "Tech Wave 2: The Sensor Revolution", BusinessWeek Online, Aug. 25, 2003.

* cited by examiner

Figure 6

ELECTRONIC CALENDAR FOR AUTOMATICALLY SCHEDULING A PLURALITY OF EVENTS BASED ON A SCHEDULING REQUEST AND OBTAINED ADDITIONAL INFORMATION

RELATED APPLICATIONS

This application is a continuation-in-part of U.S. patent application Ser. No. 10/924,072 entitled "METHODS, SYSTEMS AND COMPUTER PROGRAM PRODUCTS FOR PROVIDING APPLICATION SERVICES TO A USER," filed Aug. 23, 2004, now U.S. Pat No. 7735091, which is incorporated herein by reference as if set forth in its entirety.

FIELD OF THE INVENTION

This invention relates to computing devices, and more particularly to such devices supporting a variety of different applications.

BACKGROUND OF THE INVENTION

Computing devices are used for providing a wide variety of applications Support to users. As used herein, the term "computing device" refers to any equipment with computational capability or that is integrated with equipment with computational ability. Accordingly, as used herein, computing device can include one or more enterprise, application, personal, pervasive and/or embedded computer systems that perform computational operations and associated input and/or output devices or components thereof. Examples of computing devices, as used herein, include computer workstations, personal digital assistants, cell phones, email pagers, automobile navigation systems, and computer-controlled appliances.

As computing devices and application programs for the same evolve, along with networks interconnecting such devices, the range of customer (user) services that can be provided by computing devices is becoming increasingly complex. As a result, some customers are experiencing problems in assimilating and utilizing these computing device based application services. As a result, despite the range of available services, service functionality is generally self-limited and self-defeating and different types of application services are generally developed separately, often with only an operating system, such as the Windows operating system from Microsoft Corporation, in common. While such an operating system may provide an integrated framework allowing application programs to access hardware of a computing device, no integrating framework at an application level is provided, even though technology is becoming available which may be used to enable such a framework (e.g., Web Services and Liberty Alliance using extensible markup language (XML) over Simple Object Access Profile (SOAP) over hypertext transport protocol (HTTP) over Internet protocol (IP)).

Re-usable components for application services programs may include, for example, small pieces like code objects, a few types of standard "servers" such as Remote Authentication Dial-In User Service (RADIUS) and, a small number of standard "functions" such as authentication. As a result, such service offerings generally do not build on each other and no model or method may be available to facilitate needed interactions. Even "bundled" services, such as Office available from Microsoft Corporation, are hardly integrated in functionality, even though they may achieve data interchange compatibility. As such, service complexity generally rises too fast for customers/users as features are added, thereby reducing ease-of-use and ultimate value to the user of such application services. In addition, architectural complexity may rise too fast for conceptual designers & developers as features are added, such that increasing errors and development time and cost may result. Furthermore, security is typically piecemeal, separate, incomplete, insufficient and/or too hard to use.

One known functionality provided, for example, by Microsoft Outlook, is a calendar. However, while such electronic calendars are known, they are generally only partially connected to and integrated with other electronic services and networks, and, typically, provide only very limited functionality and convenience to users outside of their narrow scope of use. For example, when using Outlook to schedule a meeting, a requested conference room is, essentially, treated as a person that is considered to accept the meeting (thus reserving the conference room) if the conference room is available at the requested time.

SUMMARY OF THE INVENTION

In some embodiments of the present invention, methods for providing an electronic calendar to a user include receiving a request to schedule an event from the user. Additional information related to the user and/or the event is obtained by prompting the user for the additional information and/or obtaining the additional information from a database communicatively coupled to the electronic calendar. A plurality of events are scheduled based on the request to schedule an event and the obtained additional information.

In further embodiments of the present invention, the electronic calendar further determines that one of the scheduled plurality of events requires further input at a subsequent time. The user is prompted for the further input at the subsequent time and the electronic calendar is updated to revise scheduled events for the user based on the further input. A plurality of calendar rules may be associated with the user and the user may be prompted for input based on the calendar rules associated with the user. The calendar rules may include a predetermined escalation rule for the user and the user may be prompted a first time for the further input and then prompted for the input a second time in a manner specified by the escalation rule when the further input is not received responsive to prompting the user the first time.

In other embodiments of the present invention, a context is determined for the electronic calendar. The context is updated based on the received request. Prompting of the user for the input the second time is modified in a manner specified by the escalation rule based on the determined context of the electronic calendar.

In further embodiments of the present invention, one of a plurality of available personalities is associated with the electronic calendar and additional information is obtained based on the associated one of the available personalities. The associated one of the available personalities may define one or more of an accent, a communication syntax, a vocabulary, a sense of urgency, a speed of communication, a timing pattern of communication, a level of detail of communication and/or a preciseness of communication by the electronic calendar to the user.

In other embodiments of the present invention, scheduling a plurality of events includes scheduling the plurality of events on an individual calendar of the user and further includes adding selected ones of the plurality of events to a group calendar for a group in which the user is a member based on a sharing rule associated with the user and/or the group calendar. The sharing rules may be based on a type of a scheduled event and a user associated with the event.

In further embodiments of the present invention, events scheduled for other users that are members of the group are incorporated into the group calendar based on sharing rules associated with the other users and/or with the group calendar. The group calendar with the incorporated events scheduled for the other users may be displayed to the user responsive to a request from the user.

In other embodiments of the present invention, rules are defined allowing other users that are not members of the group access to the group calendar. The group calendar is displayed to the other users that are not members of the group based on the defined rules allowing the other users that are not members of the group access. The defined rules allowing the other users that are not members of the group access may prevent or limit access to specified event types.

In further embodiments of the present invention, rules are defined allowing the user access to a group calendar for a group in which the user is not a member. The group calendar for a group in which the user is not a member is displayed to the user based on the defined rules allowing the user access. The defined rules allowing the user access may prevent or limit access to specified event types.

In other embodiments of the present invention, scheduling a plurality of events further includes determining an event type for the event requested to be scheduled by the user. Preferences associated with the user and/or information regarding prior requests for scheduling of events of the determined event type by the user is obtained. The plurality of events are scheduled based on the obtained preferences and/or information regarding prior requests.

In yet further embodiments of the present invention, a context is determined for the electronic calendar. The context is updated based on the received request. For such embodiments, scheduling the plurality of events further includes determining a plurality of options for the plurality of events based on the context and prioritizing the plurality of options. Dynamic context information is requested from application service providing modules operatively coupled to the electronic calendar and one of the plurality of options is selected as the plurality of events for scheduling based on the requested dynamic context information.

In other embodiments of the present invention, methods for providing an electronic calendar application service providing module in a framework for providing computing device executed application services to a user using a plurality of application service providing modules, each of which provides a subset of the application services to the user include receiving a request to schedule an event. The received request is translated to at least one need to be satisfied. At least one of the plurality of application service providing modules other than the electronic calendar required for satisfying the at least one need is identified. Execution of actions by the identified at least one of the plurality of application service providing modules is requested to satisfy the at least one need. A plurality of events are scheduled based on the request to schedule an event from the user and on the execution of actions by the identified at least one of the plurality of application service providing modules.

In some embodiments of the present invention, a plurality of preference/policies are associated with the user. The received input is translated to at least one need to be satisfied based on the preference/policies associated with the user.

In further embodiments of the present invention, a security module is communicatively coupled to the electronic calendar application service providing module. security context information is obtained from the security module. Execution of actions by the identified at least one of the plurality of application service providing modules to satisfy the at least one need is requested based on the obtained security context information from the security module.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The present invention now will be described more fully hereinafter with reference to the accompanying figures, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the term "and/or" includes any and all combinations of one or more of the associated listed items.

The present invention is described below with reference to block diagrams and/or flowchart illustrations of methods, apparatus (systems) and/or computer program products according to embodiments of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Finally, it will be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion without departing from the teachings of the disclosure.

Figure 1:
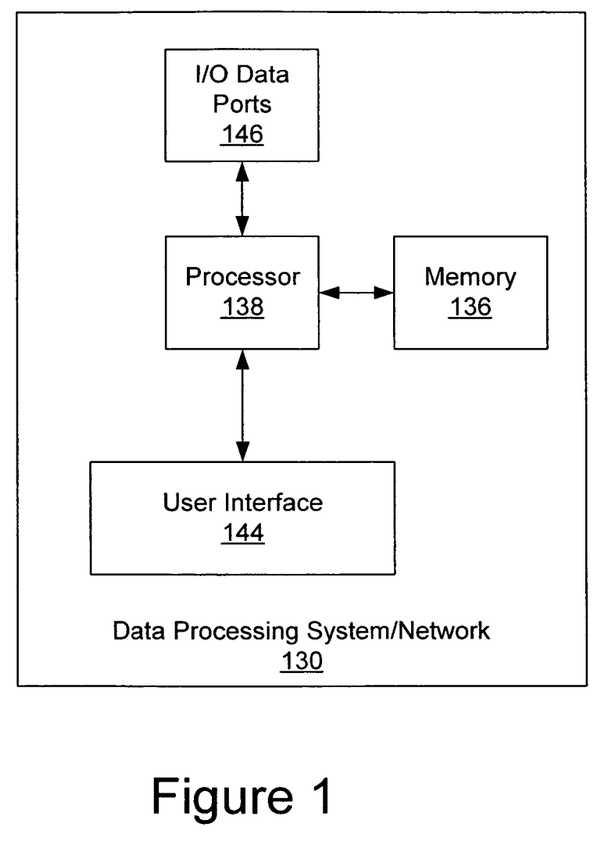
FIG. 1 is a block diagram of a data processing system suitable for use in some embodiments of the present invention.

FIG. 1 illustrates an exemplary embodiment of a computing device or data processing system 130 configured in accordance with embodiments of the present invention. The data processing system 130, which may be incorporated in, for example, a personal computer, a PDA, a wireless terminal/phone, a smart appliance or the like, may include a user interface 144, including, for example, input device(s) such as a keyboard or keypad, a display, a speaker and/or microphone, and a memory 136 that communicate with a processor 138. The data processing system 130 may further include an I/O data port(s) 146 that also communicates with the processor 138. The I/O data ports 146 can be used to transfer information between the data processing system 130 and another computer system or a network using, for example, an Internet protocol (IP) connection. These components may be conventional components such as those used in many conventional data processing systems, which may be configured to operate as described herein.

Figure 2:
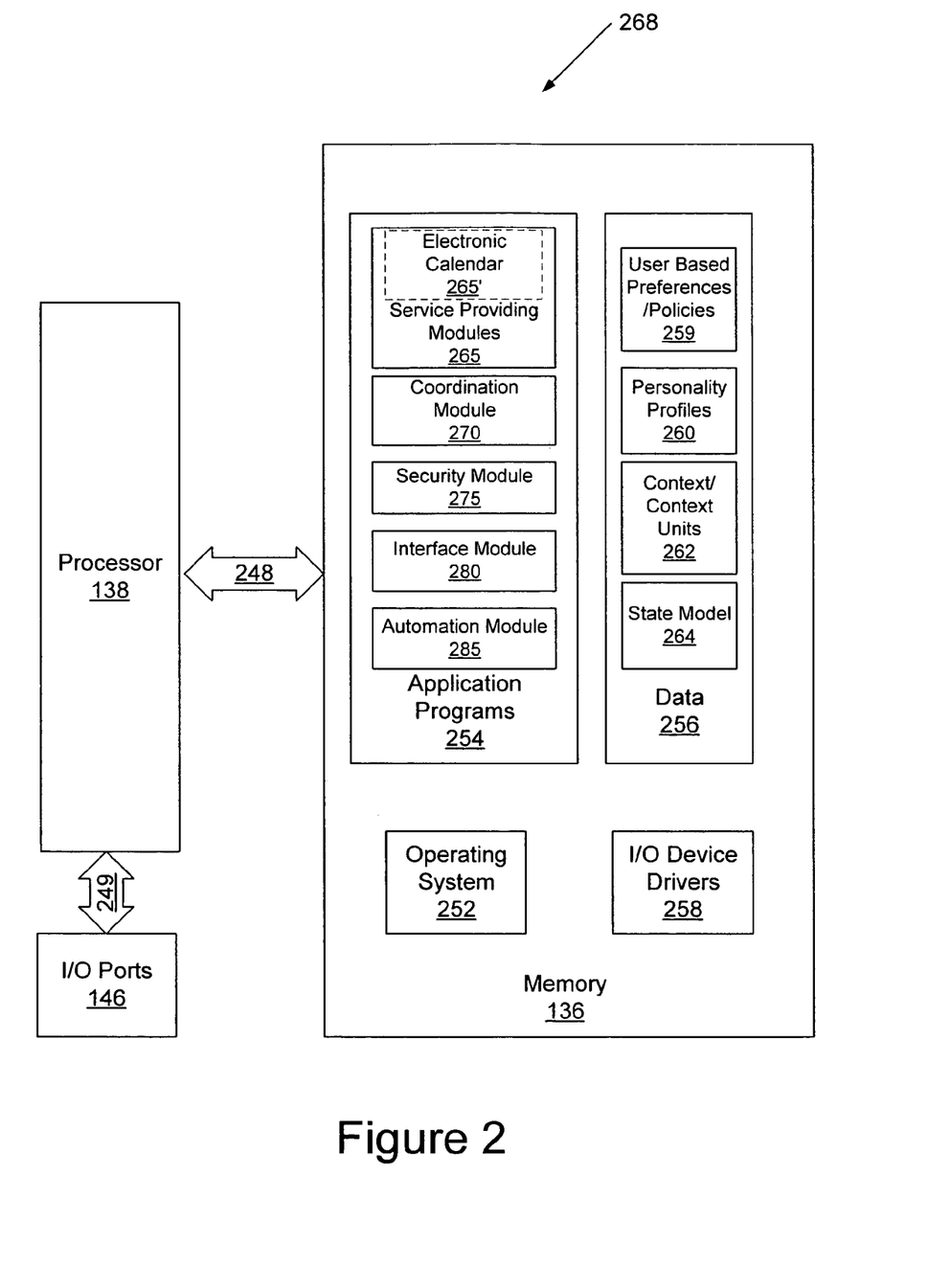
FIG. 2 is a block diagram of a system for providing application services to a user according to some embodiments of the present invention.

Referring now to FIG. 2, a block diagram of a system 268 for providing an electronic calendar is provided that illustrates systems, methods, and computer program products in accordance with embodiments of the present invention as will now be discussed. The processor 138 communicates with the memory 136 via an address/data bus 248. The processor 138 can be any commercially available or custom enterprise, application, personal, pervasive and/or embedded microprocessor, microcontroller, digital signal processor or the like. The memory 136 may include any memory devices containing the software and data used to implement the functionality of the data processing system 130. The memory 136 can include, but is not limited to, the following types of devices: ROM, PROM, EPROM, EEPROM, flash memory, SRAM, and DRAM.

As shown in FIG. 2, the memory 136 may include several categories of software and data used in the system 268: an operating system 252; application programs 254; input/output (I/O) device drivers 258; and data 256. As will be appreciated by those of skill in the art, the operating system 252 may be any operating system suitable for use with a data processing system, such as OS/2, AIX or zOS from International Business Machines Corporation, Armonk, N.Y., Windows95, Windows98, Windows2000, WindowsCE, or WindowsXP from Microsoft Corporation, Redmond, Wash., Palm OS, Symbian OS, Cisco IOS, VxWorks, Unix or Linux. The I/O device drivers 258 typically include software routines accessed through the operating system 252 by the application programs 254 to communicate with devices such as the I/O data port(s) 146 and certain memory 136 components. The application programs 254 are illustrative of the programs that implement the various features of the system 268 and preferably include at least one application that supports operations according to embodiments of the present invention. Finally, the data 256 represents the static and dynamic data used by the application programs 254, the operating system 252, the I/O device drivers 258, and other software programs that may reside in the memory 136.

As further illustrated in FIG. 2, according to some embodiments of the present invention the application programs 254 include application service providing modules 265 and a coordination module 270. In addition, a security module 275, an interface module(s) 280 and/or an automation module 285 may be provided. Other embodiments of the present invention include the service providing modules 265 and the security module 275 and optionally other of the modules. The service providing modules 265 are application service providing modules, each of which provides a subset of the application services to a user supported by the system 268 for providing computing device executed application services to a user. In some embodiments of the present invention, the coordination module 270 is configured to translate requests from a user to need(s) and to schedule execution of actions by ones of the plurality of application service providing modules 265 to satisfy the need(s). The security module 275 may be configured to receive security context information from ones of the plurality of applications service providing modules 265, define a security level global context based on the received security context information and communicate the security level global context to the plurality of application service providing modules 265. The interface module(s) 280 in some embodiments of the present invention are not visible to the user, whereas the application service providing modules 265 may be visible. The interface module(s) 280 may communicatively couple the application service providing modules 265 to each other and dynamically restrict communications in-progress between the application service providing modules 265. The automation module 285 may be configured to receive information regarding user requests and needs and predict future needs for the user and possible actions based on processing rules for the user.

In other embodiments of the present invention, the data 256 includes one or more personality profiles 260. One or more of the application service providing modules 265 is configured to incorporate a selected one of the plurality of personality profiles 260 to provide an interface to a user having characteristics defined by the selected one of the personality profiles 260.

In yet other embodiments of the present invention, one or more of the application service providing modules 265 is provided a respective subset of the application services to be provided to the user that is grouped based on an anthropomorphic model of non-computing device based providers of corresponding application services. In other words, the grouping of services supported by a particular application service providing module may be modeled in a manner where the grouping of services for a particular module are based on human counterpart service providers rather than a programming model or the like. The anthropomorphic model subsets of each application service providing module may then be communicatively coupled by the interface module(s) 280.

The security control module 275 may be configured to communicate with the application service providing modules 265 to define an integrated security model for the system to control operations of the application service providing modules 265 based on the integrated security model. The interface module(s) 280 may be configured to communicatively couple the application service providing modules 265 and filter communications between the application service providing modules 265 based on the integrated security model. The security control module 275 may be configured to communicate with the interface module(s) 280 to define the integrated security model. Thus, the integrated security model may be utilized to control both the sending of messages by the application service providing modules 265 and to control filtering out of messages to and from the application service providing modules 265 at the interface module(s) 280. The integrated security model may also be used to control re-assignment of tasks or services from one or a group of application service providers to another one or group of same, and this may be effected by the interface module(s) and/or security-related modules.

Additional aspects of the data 256 in accordance with embodiments of the present invention are illustrated in FIG. 2. As illustrated in FIG. 2, the data 256 may include user based preferences/policies 259, the personality profiles 260, dynamic context (including context unit) information 262 and/or state machine model(s) 264. The user based preferences/policies 259 may be used to change operations for providing computing device executed application services to a user based on particular characteristics or desires of the respective user.

As discussed above, the personality profiles 260 may be used to provide a selectable personality for an application service providing module 265 for all and/or selected users. The dynamic context information 262 provides a dynamic context database accessible to the various application programs 254 that, as will be described further with reference to the flow charts below, may be used to modify operations and delivery of application services responsive to the dynamic context of various components of the system. The interlocked state machine model(s) 264 may be used to control operations and application service providing so as to provide enhanced security and control opportunities. As used herein "interlocked" state machine model(s) refers to the interrelationship between models for respective nodes or application service providing modules and/or the flows related to communications between those nodes as seen, for example, at interface module(s) between the nodes in carrying out user need fulfillment operations or other operations, as, for example, various overhead operations needed to maintain or enable basic functioning.

Also illustrated in the embodiments of FIG. 2 is an electronic calendar module 265' that may be provided in a framework for providing computing device executed application services to a user using the plurality of application service providing modules 265. The electronic calendar 265' may be configured to provide a means for receiving requests to schedule an event from a user, obtain additional information related to the user and/or event by prompting the user for additional information and/or obtaining additional information from a database coupled thereto and schedule a plurality of events based on the request to schedule an event and the obtained additional information. Thus, some embodiments of the present invention may provide for auto-building or meta-scheduling wherein an individual event request can be automatically converted by the electronic calendar into a sequence of different events suitable for scheduling on a user's calendar and may further interact with other users' electronic calendars to determine their availability (which in turn may affect what events and the timing of the plurality of events scheduled on the user's calendar) and request scheduling of appropriate calendar events on the other affected users' calendars. The scheduling of the plurality of events by the electronic calendar 265' may be based on context, user profile and/or dynamic context information from other application service providing modules integrated in an application service providing module with the electronic calendar 265'.

Context within an application service providing framework generally refers to detailed internal conditions/indications/assessments at various points and hierarchies within the framework, not simply to "what is being connected to," "what type of transaction is occurring," "what zone is being accessed," "what is included in the transaction," and the like. Pertinent contexts may be referred to by the various framework application service providing components, such as the electronic calendar module 265', in order to self-adjust their modes of operation, options they employ, alternate approaches they use in transactions with other components, parameters they use in their internal processing, methods available in their programming, filtering of messages they receive and/or forward, and the like. By being provided access to those particular selected contexts (generated at various points throughout the framework) which (via the design and arrangement of the framework) have particular bearing on its own operations and actions, each framework component (and pre-defined component group) may be provided with the pertinent global-to-local framework knowledge that enables it to modify its operation so as to increase framework security, reliability, and functional flexibility.

As noted above, a dynamic context may be associated with the application service providing module. The "dynamic context" for an application service providing module, as that term is used herein, is dependent on a condition of another of the application service providing modules, or other modules such as infrastructure modules, that is not determinable based only on communications from the application service providing modules, or other modules, resulting from execution of application service related actions, or the actions of other modules. In other words, the dynamic context as used herein provides information related to an operational condition or security state of others of the application service providing modules, or other modules, that is not determinable merely from transaction communications generated during execution of actions to fulfill needs by the application service providing modules, or by the various functions/actions of the other modules. For implementation efficiency and convenience, this definition may be relaxed somewhat, in that the test of "not determinable" could be replaced with "not easily determinable." Thus, the dynamic context could involve a variety of different types of information.

While the present invention is illustrated with reference to the various modules 265, 265', 270, 275, 280, 285 being application programs in FIG. 2, as will be appreciated by those of skill in the art, other configurations fall within the scope of the present invention. For example, rather than being an application program, the interface module 280 may also be incorporated into the operating system 252 or other such logical division of the data processing system 130. Furthermore, while the various application programs 254 are illustrated in a single data processing system, as will be appreciated by those of skill in the art, such functionality may be distributed across one or more data processing systems. For example, the security module 275 may be resident on a distinct device from the application service providing modules 265, and various application service providing modules 265 may be resident on different devices, and distinct instantiations of the same application service providing module may be resident on different devices. Thus, the present invention should not be construed as limited to the configuration illustrated in FIGS. 1 through 2, but may be provided by other arrangements and/or divisions of function between data processing systems. In fact, as will be clear from the description herein, the functionalities of the present invention will typically be distributed across a network of communicatively coupled computing devices and may utilize a variety of input/output devices to provide application services to users.

Figure 3:
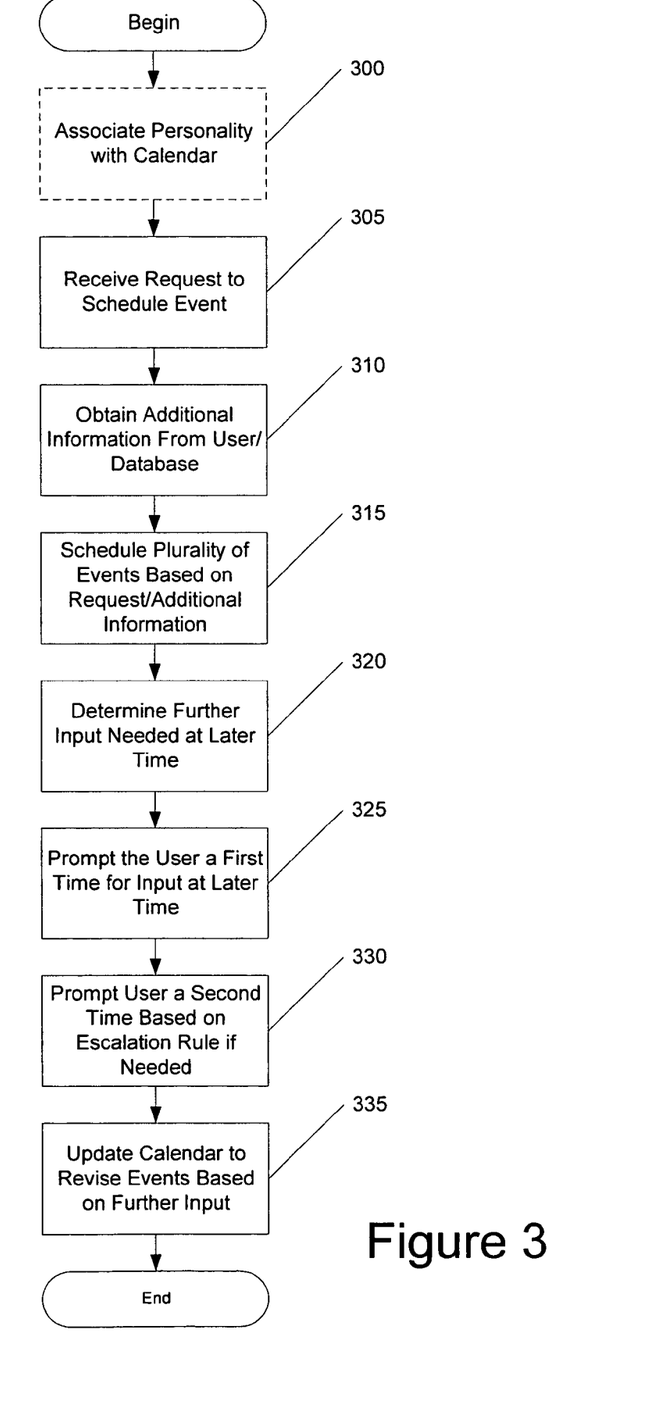
FIGS. 3-6 are flowcharts of operations that may be performed according to various embodiments of the present invention.

Operations according to various embodiments of the present invention will now be further described with reference to the flow chart illustrations of FIGS. 3 through 6. Referring first to FIG. 3, methods for providing an electronic calendar to a user will now be described for various embodiments of the present invention. Operations begin at Block 300 with, in some embodiments of the present invention, associating one of a plurality of available personalities with the electronic calendar. A request to schedule an event is received from the user (Block 305). Additional information related to the user and/or related to the event is then obtained by prompting the user for the additional information and/or obtaining the additional information from a database communicatively coupled to the electronic calendar (Block 310). For example, the additional information may be obtained from the contacts database 262 or the user based preferences/policies database 259. The initial prompting of a user at Block 310 for information may be for additional information needed to initiate/carry out auto-scheduling or meta-scheduling as contrasted with needed additional information that is identified as part of an auto-scheduling or meta-scheduling process. The additional information obtained at Block 310 may be obtained based on the associated one of the available personalities. In other words, the electronic calendar may present a request for information to a user using a personality selected by the user. The selected personality may define an accent, a communication syntax, a vocabulary, a sense of urgency, a speed of communication, a timing pattern of communication, a level of detail of communication and/or a preciseness of communication for use by the electronic calendar to the user.

Electronic calendar schedules a plurality of events based on the request to schedule an event received from the user and the additional information obtained at Block 310 (Block 315). In scheduling a plurality of events, the electronic calendar may determine that one of the scheduled plurality of events requires further input at a subsequent time (Block 320). The electronic calendar may prompt the user for further input at the subsequent time as will now be described for particular embodiments of the present invention will now be described with reference to Blocks 320 and 325 where the particular embodiments provide for escalation. In such embodiments, calendar rules are associated with the user and prompting the user for further input may be based on the calendar rules associated with the user, including a predetermined escalation rule for the user. In such embodiments, the user is prompted the first time for the further input (Block 325). When the further input is not received from the user responsive to prompting the user for the first time at Block 325, the user is prompted for the further input a second time in a manner specified by the escalation rule (Block 330). The electronic calendar is updated to revise scheduled events for the user based on the received further input (Block 335). The user may be prompted for input the second time at Block 330 in a manner that is modified as specified by the escalation rule based on a determined contacts as will be described with reference to further embodiments herein.

Figure 4:
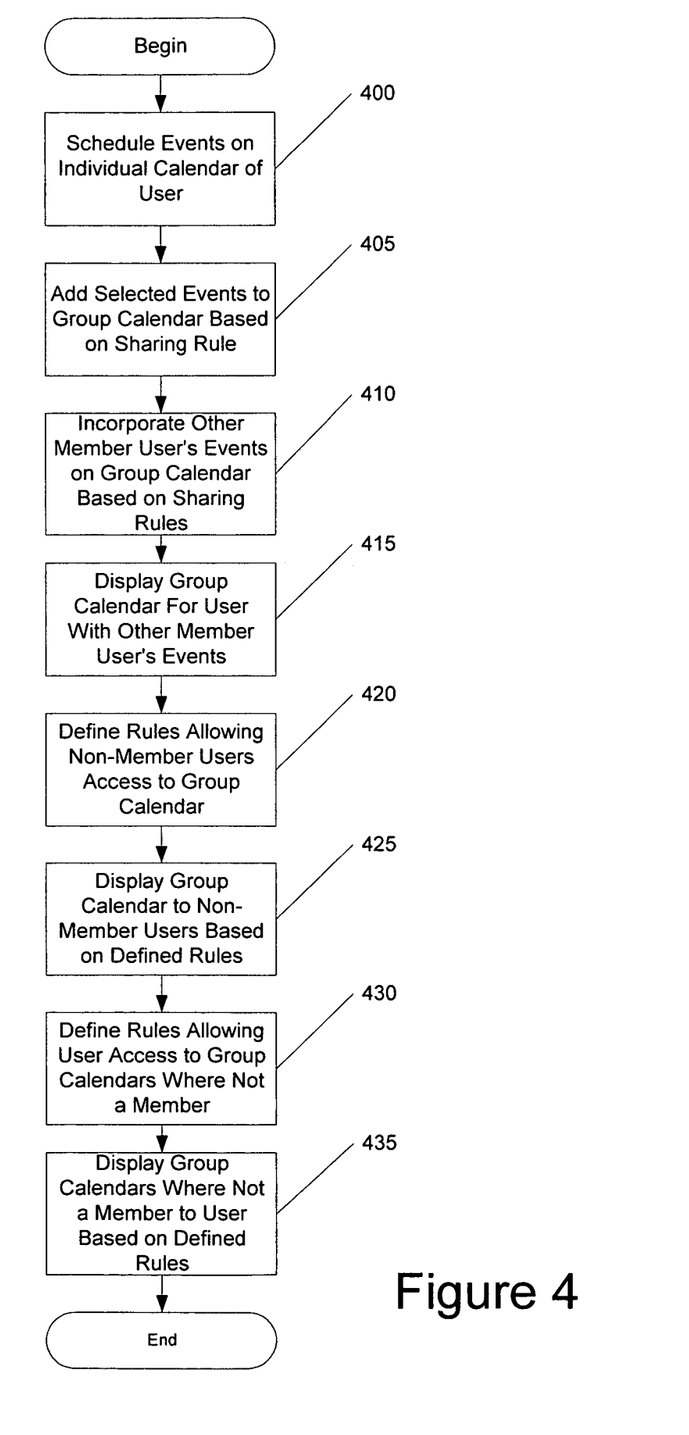

Further details of operations related to scheduling a plurality of events according to various embodiments of the present invention will now be described with reference to the flow chart illustration of FIG. 4. In particular, FIG. 4 will describe aspects of various embodiments of the invention providing group as well as individual calendars and/or selective sharing of an individual user's event information across different groups. As shown at Block 400 of FIG. 4, operations begin by scheduling a plurality of events on an individual calendar of the user. Selected ones of the plurality of events scheduled at Block 400 are added to a group calendar for a group in which the user is a member based on a sharing rule associated with the user and/or the group calendar (Block 405). For example, the event may be a sporting event in which the user will be participating and the user's family may wish to attend as spectators and/or may be needed to drive the user to the sporting event. As such, a sharing rule(s) may be provided for the user specifying that such sporting event type events be automatically added to the family calendar for a sporting event type event scheduled on the individual user's calendar. Thus, the sharing rule(s) may be based on a type of a scheduled event and/or a user associated with the event.

Events scheduled for other users that are members of the group are incorporated into the group calendar based on sharing rules associated with the other users and/or with a group calendar (Block 410). Thus, the user may not only share information about the user's events but may be provided access to information about other group/family member events. The group calendar with the incorporated events scheduled for the other users may be displayed to the user responsive to a request from the user (Block 415).

Rules may also be defined allowing other users who are not members of the group access to the group calendar (Block 420). For example, a group calendar may be associated with a particular family and members of a related family, such as aunts, uncles, cousins and the like, may have rules defined allowing them access to the user's family calendar depending on, for example, the event type or the user associated with the event. Thus, the rules defined at Block 420 allow for selective sharing of information with users who are not members of the group calendar being shared. The group calendar is displayed to the other users that are not members of the group based on the defined rules allowing the other users that are not members of the group access to the group calendar (Block 425). The defined rules may allow the other users that are not members of the group access while preventing access to specified event types or may be structured to specify event types where access is allowed and preventing or limiting access to other event types. Other rules may be defined to satisfy selected access requirements appropriate for a particular group calendar depending upon the identity of the user being granted limited access to the group calendar.

Rules may also be defined allowing the user access to a group calendar for a group in which the user is not a member (Block 425). Thus, the user may be provided limited access to the user's aunt/uncle/cousin family calendar. The group calendar for the group in which the user is not a member may be displayed to the user based on the defined rules allowing the user access (Block 435). The rules defined at Block 430 may be written as specifying preventing or limiting access to specified event types or allowing access to specific event types and preventing or limiting access to non-specified event types, with the flexibility to provide differential limited access based on the identity of the user outside the group seeking access.

Figure 5:
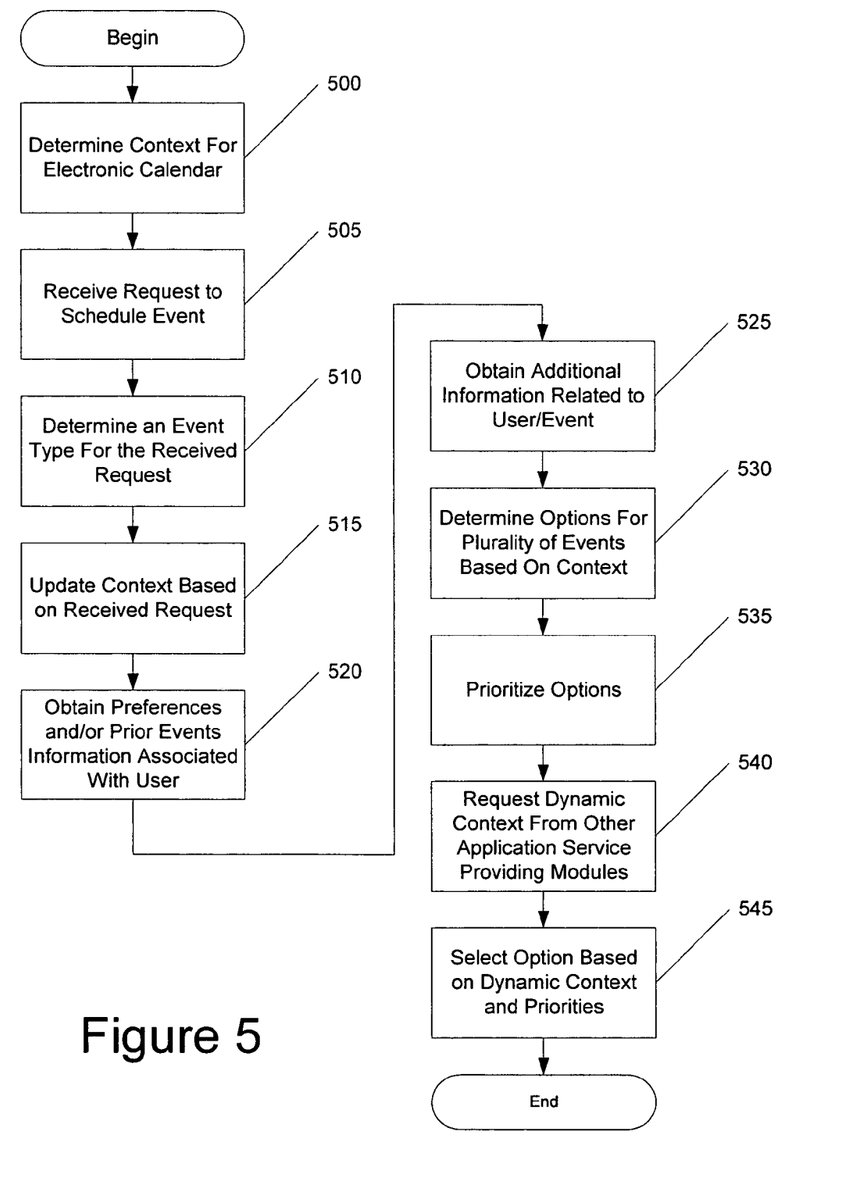

Operations for further embodiments of providing an electronic calendar to a user according to the present invention will now be described with reference to the flowchart illustration of FIG. 5. As shown in FIG. 5, operations begin at Block 500 by determining a context for the electronic calendar. A request is received from a user to schedule an event (Block 505). An event type for the event requested to be scheduled by the user is determined (Block 510). The context for the electronic calendar is updated based on the received request (Block 515). Preferences associated with the user and/or information regarding prior requests by the user for scheduling events of the determined event type are obtained (Block 520).

Additional information is obtained related to the user and/or the event, either by prompting the user for the information and/or obtaining the information from a database coupled to the electronic calendar (Block 525). A plurality of options for scheduling of a plurality of events is determined based on the context (Block 530). The options may be determined based on the context and/or the preferences and/or prior events information obtained at Block 520. The plurality of options for scheduling events are prioritized (Block 535). For example, a best, second best, third best etc. approach to scheduling individual events to fulfill scheduling of the event requested by the user may be identified in anticipation that some of the options may be restrained by other application service providing module's context (such as availability of an associated user at a particular time). Dynamic context information is requested from application service providing modules operatively coupled to the electronic calendars (Block 540). One of the plurality of options is selected as the plurality of events for scheduling based on the requested dynamic context information and/or the priorities determined for the options at Block 535 (Block 545).

Figure 6:
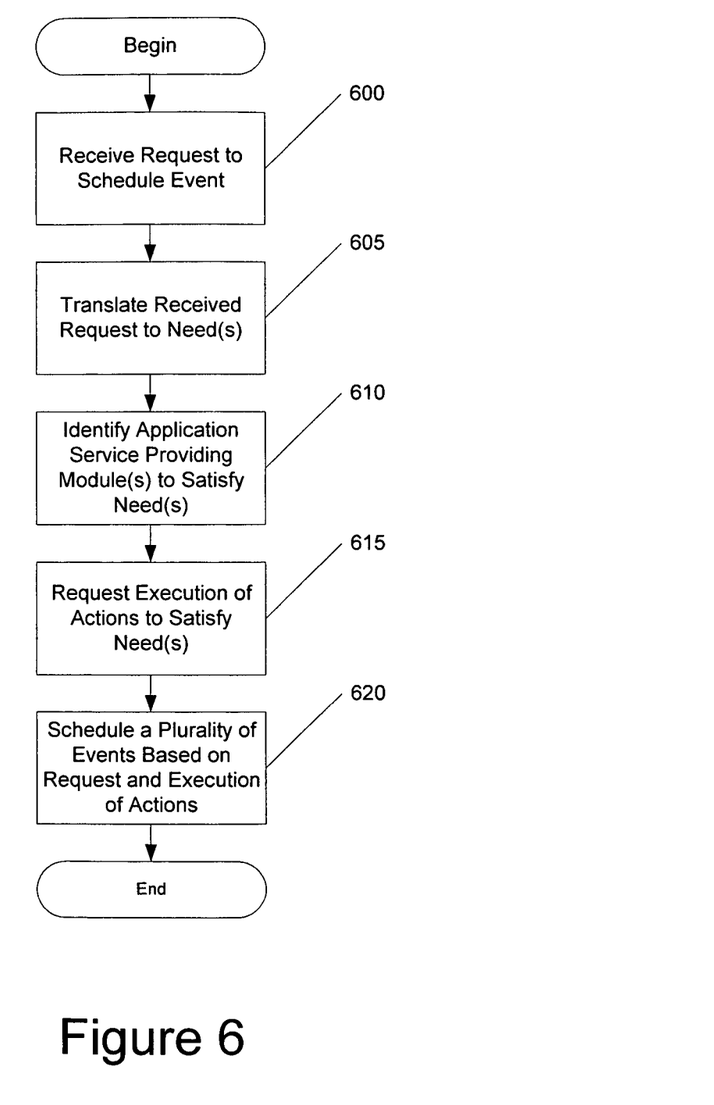

Methods for providing an electronic calendar application service providing module in a framework for providing computing device executed application services to a user using a plurality of application service providing modules, each of which provides a subset of the application services to the user, will now be described for some embodiments of the present invention with reference to the flowchart illustration of FIG. 6. Operations begin at Block 600 by receiving a request to schedule an event. The received request is translated to one or more needs to be satisfied (Block 605). In some embodiments, a plurality of preference/policies are associated with the user and the received input is translated to one or more needs to be satisfied based on a preference/policies associated with the user.

One or more application service providing modules, other than the electronic calendar, required for satisfying the need (s) are identified (Block 610). Execution of actions by the identified application service providing module(s) are requested to satisfy the need(s) (Block 615). In some embodiments of the present invention, the security module 275 (FIG. 2) is communicatively coupled to the electronic calendar application service providing module 265'. In such embodiments, operations at Block 615 may include obtaining security context information from the security module 275 and basing the request for execution of actions by particular application service providing modules to satisfy the need(s) on the obtained security context information from the security module 275. For example, if the framework identifies one of the application service providing modules context as having a high risk of loss of confidentiality, actions potentially exposing a user's personal information to others may be routed to a different module with a more secure context for execution and/or an alternative approach to satisfying the user's requested scheduled event may be selected when translating the received request to need(s) at Block 605. A plurality of events are scheduled based on the request to schedule an event and the execution of actions by the application service providing modules (Block 620).

Some embodiments of an electronic calendar will now be further described where the electronic calendar is an application service providing module integrated within an application service providing framework with other application service providing modules. For these particular embodiments, the electronic calendar is connected to other application service providing modules and to other networks, which may be supporting frameworks for different users/groups of users. Such embodiments of the present invention may thereby provide enhanced and expanded calendar-related functionality to users.

In one aspect of an electronic calendar within a framework as noted above, group/family calendaring may be provided with appropriate supporting capabilities. In addition, auto-building of calendar events utilizing information available at the time of a scheduling request may be provided. Various reminders and queries for auto-obtaining associated needed information may also be provided. In particular embodiments, selective sharing functions and auto-triggering of events/action/requests by other application service providing modules may be provided. In addition, inherent security, including privacy, may be provided.

Details of operations for an example embodiment of an electronic calendar in an application services providing framework will now be provided. A Planner component of the electronic calendar 265' provides a primary visible component of the electronic calendar that interacts with users. The Planner component may have settable "personalities" establishing desired interactivity characteristics. The Planner component accesses other framework application services providing components as needed. For example, the Planner component may interact with a database to access user profiles, history, and other data saved data regarding the user and/or event/activity being scheduled. The Planner may also interact with a Composer module to initiate actions within the framework by other modules and with a Security Controller module to access security checks and related functions. The Planner may also interact with a Mediator (interface) module to access other application service providing modules and/or external services.

The framework may be an ASPIC framework that may then engage other component modules as described in U.S. patent application Ser. No. 10/924,072 entitled "METHODS, SYSTEMS AND COMPUTER PROGRAM PRODUCTS FOR PROVIDING APPLICATION SERVICES TO A USER," filed Aug. 23, 2004, which was incorporated herein by reference above as if set forth in its entirety. Processing flows may provide output(s) to a user, to other ASPIC framework modules and/or to external services. Flows may include: Input>ASPIC processing>output; Timed events (created by previous ASPIC framework processing)>processing>output; ASPIC framework events>processing>output; and External events>processing>output.

An exemplary process flow for some embodiments of an electronic calendar in an ASPIC framework will now be described. A main process loop seeks (direct or mediated) input: from the user, for example, a user wishes to set-up future schedule input from family members; from other ASPIC framework application service providing modules, such as an Electronic Butler providing obtained input; and/or from an external network-interfaced devices/systems, such as an external request for a calendar entry, an external response to a calendar output and/or shared calendar views. Upon receiving input, the main branch temporarily branches to an appropriate sub-process, for example, based on an input type, source, value etc. The sub-process (such as another application service providing module) performs actions or requests, which performance may be moderated by context. The sub-process may call other sub-processes and may interface with the ASPIC framework as needed. The sub-process may obtain an associated result and then branch to an output process.

The output process provides output to a user as appropriate. The form of the output, and the content, may be moderated by a settable personality selected for the output of the electronic calendar module. The output process may generate output responsive to a concurrently received input or as a timed/scheduled event. The timed/scheduled event may be based on earlier user input and/or on an earlier non-user input/occurrence, which may be detected by a different application service providing module in the ASPIC framework. The output process may provide output to other components of the ASPIC framework as appropriate, such as responsive to a concurrently received input, as a timed event or as a status report. Operations may then return to the main process loop of the electronic calendar module.

An example of operations based on these flows will now be provided. In this example, the input is a user scheduling or implying a parent-teacher conference or a planned future family cook-out, including selected friends/neighbors. The input is classified (e.g., as an event or "meta-event" such as a request to plan a family cook-out, e.g. an event to be planned to obtain the appropriate corresponding scheduled events). A context of the electronic calendar is updated based on the event and the type of event is identified as an event type or meta-event type (e.g., cook-out for family plus guests). A related database is accessed to obtain and select best match selector (options) data based on the input(s).

One (or more) related action/need is identified. To identify the action/need a Security Controller module 275 may be consulted, if appropriate, depending on the input type and electronic calendar context. Related information, such as a profile, may be determined for particular event or meta-event types. In addition, options, such as "schedule on master calendar," "gather info," "meta-schedule," "check various user's calendars," "update various user's calendars," "create new calendar" and the like, may be looked up for responding to the input. A best option (or option sequence), 2nd best, 3rd best, and the like may be selected for the current context of the electronic calendar.

The ASPIC framework controlled action may then be initiated and performed. For example, a need may be formulated to send to a Composer module, for example, requesting meta-scheduling to be initiated. The Composer may then cause the ASPIC framework to meta-schedule, request needed information and add the event to a history record.

Example responses to the initiated action may include querying the affected user to provide needed information, such as which friends to invite. The affected user may be queried and provide preferences, such as which days or weeks or times are preferred for the cook-out. In some instances, no response may be required. Subsequent input may also be classified and the electronic calendar context may be updated. Thus, the cook-out may be scheduled or at least more fully scheduled, or if a no response rule is applied, actions may be escalated, for example, following consultation with the Security Controller module, with updates on details, percent of scheduling completed, status and the like. Operations may repeat as needed.

For embodiments of the present invention including meta-scheduling, an example of a framework for characterizing the meta-event type will now be described. The type of event to be scheduled, and sub-type, if applicable, may be specified. Modifiers, such as urgency, priority, importance, financial, privacy/security, overlap and the like may be specified. Participants, initial, tentative, updated, final and the like may be identified, either as individuals and/or categorized into groups where appropriate. The expectations of participants may also be specified along with a desired result, which may include both a general result and key details, and major information inputs needed.

For each input a variety of parameters may be specified within the meta-schedule framework. Such parameters may include: a pertinent party; prioritized contact methods and addresses; schedule demand (such as when the input is needed, relative to completion); a query frequency; a status; dependencies, if any, such as what will be blocked if input is not received; and an escalation approach to obtain the input if not initially successful.

An overall schedule may be specified in the meta-schedule framework. In addition, major milestones/decision points/alarm points may be specified. An overall status may be specified including an expected completion/ready date.

To further illustrate some embodiments of the present invention, usage of a simplified (Complete Simplification (CS)) application service framework including an electronic calendar according to some embodiments of the present invention will now be described for a hypothetical household including parents, Jim (age 55) and Martha (age 49), their children Megan (age 25), Jason (age 20), Tom (age 15) and Tia (age 10). The family has two pets, named Spot (a dog) and Mittens (a cat). Jim is an accounting manager at a large corporation. Martha runs a part-time business out of their home. Megan works as a salesperson at a discount retailer, while Jason attends a downtown university. Tom and Tia attend local high school and middle school, respectively. The CS framework may utilize the home network, cellular and hotspot networks and Internet services and could be thought of as a "catch-all" for a number of related services potentially bundled together, but may also be a highly-integrated holistic service in its own right.

The framework, when using the Internet Protocol (IP) suite, may be viewed as an evolved IP centric integration of many possible applications that could leverage the flexibility and capability of next generation networking (both wireless & wire-line). It might also be viewed as a richly featured artificial intelligence network for IP. Network/service providers may operate as mediators, providing the logical integration used to obtain the full feature set and capabilities described and possibly to conduct billing, provide high availability & scalability, ensure security, provide automated backups and the like. Various enabling technologies such as wireless local area network (WLAN), Bluetooth, Ultra Wide Band (UWB), integrated wireless-wireline, web services, virtual private network (VPN), biometric & smartcard authentication, non-repudiation, digital rights management (DRM), and the like may be used in providing the framework, however, the depiction described herein does not focus on the enabling technologies. In addition, while this example is presented primarily in a household context, it will be understood that it is likewise extendible to a business environment.

Proceeding now with the example, in the morning, each family member wakes (Megan awakes remotely from the rest of the family in her own apartment, but is included as part of the household by logical association by the CS framework/service. Information and Entertainment components of the CS service provide the appropriate content (variable by user) to each person in the family, and likewise provide the appropriate controls or commands to each wireless-connected device previously associated with each person (or persons). For example, WLAN-controllable and/or Bluetooth-controllable appliances like clock radios, TV tuners, sound systems, lamps or light switches, and the like may be controlled by the CS service via the home gateway and wireless slaves or repeaters. Power-line communication technology could also be used.

Like the rest of the family, Jason wakes and takes a bleary look at the customized news feed, but unlike them he goes back to sleep since his first class is in the afternoon and his class load does not require studying this morning. He recalls he needs to update his schedule so that it better reflects his study habits of the last week or two. Sensing that he does not actually get up, the news feed switches to light jazz (streaming audio) at low volume.

Jim leaves the house for work. In his car he listens to informational MP3's (e.g., audio books or articles) downloaded automatically during the night according to his reading and continuing education settings, first a section of a new bestselling historical novel and then a short briefing on a particular accounting method revising the generally accepted practices central to his profession.

In her car, Megan is driving to see her mother, listening to some new music MP3 files downloaded last night by the CS Entertainment component according to her preferences. Preferences could be detailed or general. Each component could remember preferences for each user. Some preferences could be learned over time, while others would be selectable by the user. Selectable preference profiles might also be used. As it is on her way, she often drops by to have breakfast with her mom prior to being at the store by opening time. As she drives, she tells the car to copy some of the MP3 songs to her sister Tia, subject to applied DRM parameters where a security component of the CS service may block the copy operation. She knows Tia would like this sort of music, and because they commonly share files she is sure Tia does not already have the particular selections.

Martha does some planning for the family while making breakfast and seeing everyone off. A Planner component lists upcoming tasks with known deadlines, including needed pet vaccinations. She finds that the Planner, utilizing the Communicator component, has already checked with the veterinarian's office, for which the CS service authenticates the veterinarian's office computer, and has cross-checked her own schedule, and is suggesting several available appointment times this week to get the required rabies vaccinations for Spot and Mittens. Selecting the one she prefers, the appointment is automatically completed, verified by the vet's office almost immediately, and transferred to her phone/PDA according to her preferences. Martha also notices that Jim's car has notified, for example, by wireless message transmission, the Planner that it is nearly due for an oil change, so she flags that for his attention, in effect raising its priority and sending it to his phone for him to consider (the Planner will remind them again if not scheduled within the next week).

When Megan arrives, the CS Butler component informs Martha that her daughter is entering the driveway. The Butler component may perform some of the typical tasks traditionally associated with a live butler. It might be customizable in many ways, store preferences for household and user, and be selectable in terms of "personality," as for instance Martha prefers an "Italian" rather than an "English" Butler. Megan uses the thumb-scanner on her phone to unlock, subject to biometric authentication and/or smartcard and private key verification, the side door and makes her way to the kitchen where her mother is warming breakfast. They visit for a half-hour or so. When Megan leaves for work Martha turns to her home business, reviewing updated summaries prepared last night by her Business Assistant. Today, it helps prepare her for an upcoming lunch meeting.

Tom and Tia are on their buses headed for school. High school is tough for Tom this year since he is in advanced placement classes. He pulls up his latest summary session on his data phone to review the points he was having difficulty understanding last night.

Tia's middle school class plans a field trip today to the art museum. She uses her data phone to IM her friends in the other two 4th grade classes, so that they can synchronize their locators, such as global positioning system capabilities of the phone, protected for security/privacy by the CS service, to get together at the museum later. Through a Security component, Martha receives a request for locator usage from Tia's phone, and okay's the request after reviewing the authenticated/verified ID's of the other participants.

At work, Jim uses his data phone as his main phone (it switches to work mode upon sensing the work WLAN). He also stores files on the phone, and transfers files over VPN to his home office PC, with automated file transfers and mirroring. In both cases the Security component recognizes these as work files and applies appropriate restrictions and protections, such as smart card keying to Jim's identification for read restriction of the files. Note that the Security component both intercedes based on recognized context, and also proactively takes actions according to user preferences. Such actions may include arranging and protecting home computer backup data, and could support automated backup of data for Jim's employer as well. When used by an employer, it could perform additional cross-modal security functions such as monitoring home usage of work files and providing associated audit reports to the employer.

Jason eventually wakes up (his Assistant provides a timed sequence of reminders he has previously selected, or included in his selected preference profile) and heads to class. The family Planner updates his phone with various family-schedule data and merges similar information from some of his friends according to his permissions (monitored by the Security component). His Assistant notifies him of non-urgent messages from his father and brother, providing a brief summary. There may be just one Assistant, but since it maintains a different view for each user, it is convenient for each person to think of their own "personal" Assistant, Planner, Communicator, Tutor, etc. On the other hand, for a variety of reasons some CS components would likely be best thought of as shared or imposed rather than personal. For example the Butler is shared and the security component is limited in how it is controlled as it controls security policy.

At school, Tom uses his data phone to store & transfer class assignments. With mediation provided by the Security component, it can interface with the school WLAN and Bluetooth or UWB enabled PCs or laptops or projectors. Rules imposed by the school can be mediated and subsequently enforced by the Security component as well.

At the Museum, Tia downloads additional information on various exhibits into her phone using the museum WLAN. Some of her friends have downloaded info from different exhibits, and upon getting together they share data so that everyone has a full set. The Security component provides protection. For example, filters are set to firewall phone access. Downloaded data, particularly executable types, may be quarantined pending virus scanning. Scanning files may not be possible on the phone itself, but rather may require transfer to another machine. If Tia insists upon viewing or running a quarantined file before returning to home or school, the Security component may expedite scanning for that file over the cellular network depending on service settings and billing rules & limits.

At lunch, Jim uses his data phone and the restaurant WLAN to send & read messages, control his office PC so as to send requested files to colleagues, and to access his home network for personal tasks. The Security component provides needed protection so that these capabilities are safely enabled. Mediation via pre-arranged policy is provided so that an optimal balance of safety versus capability is obtained in all cases.

Martha meets a potential client for lunch, and with her laptop accesses the hotspot WLAN to access sites including her home business web site in order to present a proposal and conduct a demo while two of her partners (each at their own homes in different cities) participate in the discussion. Her Business Assistant provides reminders of important points she wanted to be certain to include. The potential client has a laptop as well; and Martha transfers certain files to that laptop upon request, while the Security component makes certain that her business-related wireless communications are protected. The Security component detects that certain files and communications as business related, and therefore sets up authenticated and encrypted tunnels to protect data transfers. Additionally, the DRM module of the Security component can enforce copyrights by limiting future sharing/copying of DRM'ed material. Note that the Security component would incorporate and direct a number of capabilities and mechanisms to protect "mobile" data.

Other family members similarly have lunch and use their phones and other devices to access network resources, access family network resources, synchronize application data, transfer messages and files, etc. In each case, the CS Security component performs appropriate mediation.

Tia is having lunch with her class at a food court near the museum, and someone with access to the hot spot there is attempting to hack into her phone. The Security component detects a known attack type, estimates the potential severity of the attack and due to that severity exceeding a set threshold, it temporarily locks down her phone's communication feature, allowing only a secure tunnel, this tunnel is strongly authenticated & encrypted, meaning it is cryptographically secure, between her phone and the Security component itself until she moves to another location or a pre-set timer expires. The event is flagged with high priority and sent both to her father's phone (with a message that the problem is currently under control) and to a central CS service security response center. The response center keeps statistics on events such as this. Using special tools such as quick-reaction rapidly-configurable deception hosts and associated monitoring, it may initiate attempts to identify/locate & trap the culprit if possible; else it may work to inoculate all CS-enabled devices against this attack and its determinable variants. Additionally, the Security component downgrades the trust rating of Tia's phone until all its files and data have been thoroughly scanned and the integrity of its system files is suitably verified. Integrity can be verified via cryptographic hashing techniques wherein current hash results can be verified identical to previously calculated results (indicating that no changes to the files have been made).

Later that afternoon, Tom and Tia return home from school. Martha and Tia conduct a short conference with Tia's grandmother, who lives in another city. To view photos and together discuss a digital video of Tia's recent piano recital, they utilize the private portion of the family's external web site. The Security component recognizes identity credentials and allows access. The external web site may have both public and private portions (either one private portion, or multiple separated private portions). All access to the private portion is logged.

Unexpectedly, Tom finds his homework easy for a change, so he finishes it early and spends the rest of the time before dinner in an on-line collaborative gaming competition using premium-billed "turbo" (increased) bandwidth & premium QoS requested from and granted by the network, with the added cost being deducted from his weekly allowance. The Communications module can make the appropriate requests via network service APIs, and the Bill Payment component can either make immediate payment, if required, or tally & queue the payment for after-hours fulfillment. Allowances can be managed by Tom's father using an appropriate CS component such as the family's Planner. In order to accommodate the various additional protocols needed for this gaming service, the family firewall's policy is temporarily altered. The packet filter rule-set is altered to temporarily allow the extra protocol traffic to pass, even though this may lessen security slightly. The extra traffic is allowed to pass only to and from Tom's PC. Accordingly, the Security component's monitoring priority is slightly increased for the duration. Tom's PC, like most of the network-attached devices in the home (and particular each computer), is equipped with a Security component agent/client, which can provide various level of system monitoring, intrusion detection, and attack blocking, also reporting back to the Security component itself for more global oversight. The actions of this agent/client can be adjusted via changing the monitoring priority to different levels appropriate to the overall security situation. Depending on the service plan selected, which Jim and Martha can change on-line at any time, this may require additional payments. If additional payments are required, they can be charged to Jim's account or added to the amount deducted from Tom's allowance balance, depending on options selected by Jim and Martha (e.g., small surcharges may be deducted from allowances while surcharges over a settable threshold may be charged to the parents, with or without requiring verification).

The game requests some personal information, and although Tom should know better he inputs the data and sends it. However, the Absolute Privacy feature of the Security component recognizes the transmitted data, intercepts it, and strips the sensitive information from the transmission. Absolute Privacy consists of network-based monitoring & blocking of sensitive information. In this case, the transmitted data is detected as a close variant of information matching an entry in a list pre-configured by Tom's father. A pop-up notifies Tom, and a medium-priority message is sent to Jim. If Tom desires, he can immediately request an exception from his father by clicking on an option in the pop-up, but he realizes he made a mistake and closes the pop-up instead. The game operates satisfactorily anyhow, so Tom soon forgets about it (although his father does not).

Jim picks up take-out on the way home from work. He and Martha have scheduled many of these occasions in advance, with the Butler, Communicator, and Bill Paying components being directed by the Planner component to arrange, order, and pay for the food in advance. Reminded by the Butler, all Jim needs to do is swing by to pick up the food, briefly checking his phone to make sure the order is correct.

Megan has dinner with friends. Jason has a late lab session. Martha tells the Butler component to chime Tom and Tia, and the family gets together for dinner. The CS service can command their phones, or nearby network-attached devices, to alert them using different tones of pre-selectable meanings (in this case a "dinner is ready" chime), or alternately can use brief digitized voice messages.

At dinner, they discuss the events of the day, casually adding items in turn to the family task list and calendar. Some items are fully detailed whereas other items require further information to be added later. Later, the CS service will remind the appropriate family members to provide the missing information if necessary.

After dinner, Jim spends a half-hour doing some preliminary on-line research regarding a serious medical condition with which Martha's father was recently diagnosed. Not wanting to take any chances that this activity would be recorded or tracked in any way, he engages the Security component's Anonymity Guard so that no record of the medical sites he accesses can be traced to him or the family. The Anonymity Guard routes his traffic through a secure proxy gateway which removes all identifying information and utilized various additional complementary techniques to ensure that no one can identify Jim by his network activity. (The Anonymity Guard also contains a built-in CALEA capability to override anonymity when directed by court order). As he gathers information, he saves files to his personal encrypted Data Vault and copies web site links to a new private section of the family internal web site he configures to allow access to Martha as well as himself. The Data Vault can be set to allow access only to the authenticated owner, or additionally to other persons as well. All data is encrypted using (at least) the public key of the owner, such that only the owner's private key allows decryption. This private key is contained in his smart-card, and is enabled only via successful biometric authentication. The family's internal web site is an expandable re-configurable intranet resource within the home, although access from outside the home can also be granted and coordinated via the Security component (with appropriate imposed policy). After more fully reviewing the information at a later date and discussing it with his wife, he may decide to utilize the Security component's Family VPN capability to arrange access for his father in-law as well. A Family VPN can be initiated between different homes when desired via the Security component and Communicator. (Jim has previously set up a semi-permanent Family VPN between the family home and Megan's apartment.)

As Jim adds links from his web browser to the private web site he just created, the Security component notices another program from Jim's PC attempting to access the Internet. The family firewall would normally allow the traffic to pass since the policy rule-set "allows" the corresponding protocol & port information typically visible to a firewall. However, the Security component is able to detect a discrepancy in the program name, in that the name claimed (and presented to the operating system on Jim's PC) is not the true name of the program. Although it has not yet been able to detect any sensitive information flowing, the Security component nevertheless flags the program traffic as dangerous so that the family firewall can block it. This is logged, and a small pop-Lip is activated on Jim's computer. Additionally, the Security component adds a deferred task to perform additional scanning and integrity verification on Jim's PC.

Subsequently, Jim and Tia access her School Page, provided by the Education component. Her teachers have inputted various information, files, documents, presentations, and web sites pertinent to the material they are currently covering into the CS system. The provider, possibly with the help of special partners (who pull in additional related material to enhance the learning experience), assembles and updates the CS School Pages for each customer so that the helpful information is always available and up-to-date. Tia has requested help with some new concepts presented in her math class, and Jim uses the information collected on the current material pages of the math section of her updated School Page to help improve her understanding. Jim scans the performance pages as well, and notes that Tia's recent quiz grades are decent but could certainly be improved, so he schedules recurring homework monitoring and help sessions with her for the next several weeks, and allows this information to be provided to her teacher so that she can be aware of their extra efforts. The School Page keeps track of a wide variety of information regarding each student's progress. This information can be viewed manually, or can be selected to be continually summarized and provided to the parents if they wish, such as when a student is having some problems. Alerts can be pre-set based on a variety of triggers (e.g., grades falling below a "B").

Martha sets up a conference with her two sisters after dinner, and they discuss their parents' upcoming 50th anniversary, making plans and coordinating tasks via their respective Planners. To keep the upcoming celebration a surprise, they use the Security component's Privacy Block feature to keep all related Calendar entries from showing up on their parents' Calendar, which they normally select to be auto-sync'ed such that it can maintain a view of each of their own Calendars. Privacy Block is used to maintain privacy via a variety of techniques depending on the circumstances. For example, it can be used to block others from seeing one or more stored items (individually selected to form a group, or set up as being related). It can also be set to obscure information in a number of ways. Additionally, it can provide deceptive information to others, depending on relative privilege & associated policy (although there are externally imposed limits on this).

Toni watches television content accumulated on the family DVR over the last several days according to his personal preferences, flipping between recorded shows, fast-forwarding past boring sections, and re-winding to see some scenes twice. As he watches, he casually selects associated web content to be bookmarked in his personal Video Page. The Video Page maintained by the Entertainment component for each viewer incorporates self-organizing features so that the viewer can keep links associated with various shows, actors, topics, and genres separate while being cross-related as appropriate. Another of the many internal web pages generated, managed, and made available by the CS service, the Video Page is closely integrated with the DVR-related (and other video-related) features of the Entertainment component.

Jason comes in late that night. His entry into the house is noted and authenticated by the Security component, and is subsequently chimed by the Butler to his parents (who are already in bed). Megan returns late to her apartment as well, as she decided to visit a club with her friends after their dinner. Often she telephones her mother in the evening, as they are very close, but the hour is too late for that, and for such occasions they have prearranged for the Butler to chime her return as well.

That night, the family members sleep while the CS continues to perform certain necessary operations standard security/functional verifications, and to any deferred special checks such as the in-depth scanning & integrity verification for Jim's PC tasked earlier. They remain unaware of the various checks and actions taking place, except for summary results recorded in the CS status log, which they may later view. The CS service Security component conducts after-hours data backups. The Physical Security Sub-module of the Security component monitors the physical security system of the family home and the wireless security system at Megan's apartment. The Communications component stores and prioritizes received messages, which are scanned for viruses by the Security component. Content is downloaded according to the preferences of various users and stored for later use, mediated and cryptographically locked by the DRM module of the Security component. Various additional modules of the Security component monitor the home for potential cyber-intrusions and check for data tampering, malware such as viruses, incursions of undesirable software such as spy-ware, etc. The Bill Payer component makes payments incurred during the day, such as for downloaded DRM'ed content that was actually listened to or viewed. Similarly, other CS components conduct off-hour functions as programmed. A set of changeable heuristic tests is externally applied to the various components to help ensure that they are functioning properly. Other verifications are based on cryptographic principles in conjunction with change logs, ensuring that the only changes made to key system elements are those which were proper and traceable to authorized log events (or hashes/digests).

If any problems are found, the service is designed so that the provider is generally able to diagnose and remedy the situation remotely. Only in rare cases might the family, or at least the parents, have to be alerted for safety's sake. Even then, the CS service is designed to be placed in whichever of several available "safe modes" is appropriate (until a complete restoration to proper functioning can be obtained).

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A computer-implemented method for providing an electronic calendar to a user, comprising:
    receiving, at a programmed computer processor circuit, a request to schedule an event from the user;
    obtaining, using the programmed computer processor circuit, additional information related to the user or the event by prompting the user for the additional information or by obtaining the additional information from a database in a memory device communicatively coupled to the programmed computer processor circuit;
    scheduling, using the programmed computer processor circuit, a plurality of events based on the request to schedule an event and the obtained additional information;
    determining that one of the scheduled plurality of events requires further input at a subsequent time;
    prompting the user for the further-input at the subsequent time; and
    updating the electronic calendar to revise scheduled events for the user based on the further input.

2. The method of claim 1 wherein a plurality of calendar rules are associated with the user and wherein prompting the user for the further input comprises prompting the user based on the calendar rules associated with the user.

3. The method of claim 2 wherein the calendar rules include a predetermined escalation rule for the user and wherein prompting the user for further input comprises:
    prompting the user a first time for the further input; and
    prompting the user for the input a second time in a manner specified by the escalation rule when the further input is not received responsive to prompting the user the first time.

4. The method of claim 3 further comprising:
    determining a context for the electronic calendar; and
    updating the context based on the received request; and
    wherein prompting the user for the input a second time further comprises modifying the manner specified by the escalation rule based on the determined context of the electronic calendar.

5. The method of claim 1 wherein scheduling a plurality of event further comprises:
    determining an event type for the event requested to be scheduled by the user;
    obtaining preferences associated with the user or information regarding prior requests for scheduling of events of the determined event type by the user; and
    scheduling the plurality of events based on the obtained preferences and/or information regarding prior requests.

6. An electronic calendar application service providing module comprising:
    means for receiving a request to schedule an event from the user;
    means for obtaining additional information related to the user or the event by prompting the user for the additional information or by obtaining the additional information from a database communicatively coupled to the electronic calendar;

means for scheduling a plurality of events based on the request to schedule an event and the obtained additional information;
means for determining that one of the scheduled plurality of events requires further input at a subsequent time;
means for prompting the user for the further-input at the subsequent time; and
means for updating the electronic calendar to revise scheduled events for the user based on the further input.

* * * * *